United States Patent
Jiang et al.

(10) Patent No.: US 11,431,470 B2
(45) Date of Patent: Aug. 30, 2022

(54) PERFORMING COMPUTATIONS ON SENSITIVE DATA WHILE GUARANTEEING PRIVACY

(71) Applicants: The Board of Regents of The University of Texas System, Austin, TX (US); The Regents of the University of California, Oakland, CA (US); Microsoft Technology Licensing, LLC, Redmond, WA (US)

(72) Inventors: Xiaoqian Jiang, Houston, TX (US); Miran Kim, Houston, TX (US); Yongsoo Song, Redmond, WA (US); Kristin Lauter, Redmond, WA (US)

(73) Assignees: THE BOARD OF REGENTS OF THE UNIVERSITY OF TEXAS SYSTEM, Austin, TX (US); THE REGENTS OF THE UNIVERSITY OF CAIIFORNIA, Oakland, CA (US); MICROSOFT TECHNOLOGY LICENSING, LLC, Redmond, WA (US)

( * ) Notice: Subject to any disclaimer, the term of this patent is extended or adjusted under 35 U.S.C. 154(b) by 124 days.

(21) Appl. No.: 16/996,061

(22) Filed: Aug. 18, 2020

(65) Prior Publication Data
US 2021/0058229 A1 Feb. 25, 2021

Related U.S. Application Data

(60) Provisional application No. 62/888,596, filed on Aug. 19, 2019.

(51) Int. Cl.
*H04L 9/00* (2022.01)
*G06F 21/60* (2013.01)
(Continued)

(52) U.S. Cl.
CPC .............. *H04L 9/008* (2013.01); *G06F 17/16* (2013.01); *G06F 21/602* (2013.01); *G06F 21/6245* (2013.01); *H04L 9/0631* (2013.01)

(58) Field of Classification Search
CPC ....... H04L 9/008; H04L 9/0631; G06F 17/16; G06F 21/602; G06F 21/6245
See application file for complete search history.

(56) References Cited

U.S. PATENT DOCUMENTS 7,743,253 B2   6/2010 Lauter et al.
8,862,895 B2 * 10/2014 Rieffel .................... H04L 9/008
                                                       713/189
(Continued)

OTHER PUBLICATIONS

Jiang et al., "Secure Outsourced Matrix Computation and Application to Neural Networks," Proceedings of the 2018 ACM SIGSAC Conference on Computer and Communications Security, Jan. 2018, pp. 1209-1222.

*Primary Examiner* — Ayoub Alata
(74) *Attorney, Agent, or Firm* — Robert A. Voigt, Jr.; Shackelford, Bower, McKinley & Norton, LLP

(57) ABSTRACT

A method, system and computer program product for performing computations on sensitive data while guaranteeing privacy. A service provider receives a first and a second ciphertext from a medical provider that homomorphically encrypts matrices A and B, respectively, using an encryption key, where the matrices A and B include medical data encoded as vectors. The service provider performs a homomorphic matrix multiplication on the first and second ciphertexts without decrypting the first and second ciphertexts. An encrypted result from the performed homomorphic matrix multiplication on the first and second ciphertexts is generated and transmitted to the medical provider to decrypt which matches a result of performing a matrix multiplication on unencrypted matrices A and B thereby enabling compu- (Continued)

tations to be performed on the medical data in a secure manner.

18 Claims, 11 Drawing Sheets

(51) Int. Cl.
 *G06F 17/16* (2006.01)
 *G06F 21/62* (2013.01)
 *H04L 9/06* (2006.01)

(56) References Cited

U.S. PATENT DOCUMENTS

| | | | |
|---|---|---|---|
| 9,306,738 B2* | 4/2016 | Loftus | H04L 9/3093 |
| 9,524,392 B2 | 12/2016 | Naehrig et al. | |
| 9,787,647 B2 | 10/2017 | Wu et al. | |
| 9,825,758 B2 | 11/2017 | Feng et al. | |
| 9,900,147 B2 | 2/2018 | Laine et al. | |
| 10,075,289 B2 | 9/2018 | Laine et al. | |
| 10,153,894 B2 | 12/2018 | Laine et al. | |
| 10,296,709 B2 | 5/2019 | Laine et al. | |
| 10,812,252 B2 | 10/2020 | Laine et al. | |
| 11,177,935 B2 | 11/2021 | Musuvathi et al. | |
| 11,196,539 B2 | 12/2021 | Lauter et al. | |
| 2011/0060917 A1* | 3/2011 | Troncoso Pastoriza | G06F 21/72 713/189 |
| 2013/0014270 A1* | 1/2013 | Sy | G06F 21/32 726/26 |
| 2017/0134156 A1 | 5/2017 | Laine et al. | |
| 2017/0134157 A1 | 5/2017 | Laine et al. | |
| 2017/0180115 A1 | 6/2017 | Laine et al. | |
| 2017/0357749 A1 | 12/2017 | Laine et al. | |
| 2018/0198601 A1 | 7/2018 | Laine et al. | |
| 2018/0375639 A1 | 12/2018 | Lauter et al. | |
| 2018/0375640 A1* | 12/2018 | Laine | H04L 9/008 |
| 2019/0182216 A1* | 6/2019 | Gulak | G06N 20/00 |
| 2019/0199510 A1* | 6/2019 | Hosh | G06N 3/0454 |
| 2019/0394019 A1* | 12/2019 | Gao | H04L 9/30 |
| 2020/0076570 A1 | 3/2020 | Musuvathi et al. | |

\* cited by examiner

FIG. 3

$$\begin{bmatrix} a_0 & a_3 & a_6 \\ a_1 & a_4 & a_7 \\ a_2 & a_5 & a_8 \end{bmatrix} \cdot \begin{bmatrix} b_0 & b_3 & b_6 \\ b_1 & b_4 & b_7 \\ b_2 & b_5 & b_8 \end{bmatrix} = \begin{bmatrix} a_0 & a_4 & a_8 \\ a_1 & a_5 & a_6 \\ a_2 & a_3 & a_7 \end{bmatrix} \odot \begin{bmatrix} b_0 & b_3 & b_6 \\ b_4 & b_7 & b_1 \\ b_8 & b_2 & b_5 \end{bmatrix} + \begin{bmatrix} a_1 & a_5 & a_6 \\ a_2 & a_3 & a_7 \\ a_0 & a_4 & a_8 \end{bmatrix} \odot \begin{bmatrix} b_3 & b_6 & b_0 \\ b_7 & b_1 & b_4 \\ b_2 & b_5 & b_8 \end{bmatrix} + \begin{bmatrix} a_2 & a_3 & a_7 \\ a_0 & a_4 & a_8 \\ a_1 & a_5 & a_6 \end{bmatrix} \odot \begin{bmatrix} b_6 & b_0 & b_3 \\ b_1 & b_4 & b_7 \\ b_5 & b_8 & b_2 \end{bmatrix}$$

FIG. 9

PERFORMING COMPUTATIONS ON SENSITIVE DATA WHILE GUARANTEEING PRIVACY

TECHNICAL FIELD

The present invention relates generally to homomorphic encryption, and more particularly to performing computations on sensitive data while guaranteeing privacy by performing homomorphic matrix computations.

BACKGROUND

Homomorphic encryption is a form of encryption that allows computation on ciphertexts, generating an encrypted result which, when decrypted, matches the result of the operations as if they had been performed on the plaintext (corresponding unencrypted data).

Homomorphic encryption is a form of encryption with an additional evaluation capability for computing over encrypted data without access to the secret key. The result of such a computation remains encrypted. Homomorphic encryption can be viewed as an extension of either symmetric-key or public-key cryptography. Homomorphic refers to homomorphism in algebra: the encryption and decryption functions can be thought as homomorphisms between plaintext and ciphertext spaces.

Homomorphic encryption can be used for privacy-preserving outsourced storage and computation. This allows data to be encrypted and out-sourced to commercial cloud environments for processing, all while encrypted. In highly regulated industries, such as health care, homomorphic encryption can be used to enable new services by removing privacy barriers inhibiting data sharing. For example, predictive analytics in health care can be hard to apply due to medical data privacy concerns, but if the predictive analytics service provider can operate on encrypted data instead, these privacy concerns are diminished.

Currently though such service providers only support plaintext operations with the ciphertext. That is, such service providers evaluate an encrypted model of the plaintext data. As a result, homomorphic encryption schemes utilized by the service providers are slow and memory-intensive thereby limiting the outsourcing of sensitive data to third parties, such as a cloud service provider.

SUMMARY

In one embodiment of the present invention, a method for performing computations on sensitive data while guaranteeing privacy comprises receiving a first and a second ciphertext from a medical provider that homomorphically encrypts matrices A and B, respectively, using an encryption key, where the matrices A and B comprise medical data encoded as vectors. The method further comprises performing a homomorphic matrix multiplication on the first and second ciphertexts without decrypting the first and second ciphertexts. The method additionally comprises generating an encrypted result from the performed homomorphic matrix multiplication on the first and second ciphertexts. Furthermore, the method comprises transmitting the encrypted result to the medical provider to decrypt the encrypted result which matches a result of performing a matrix multiplication on unencrypted matrices A and B thereby enabling computations to be performed on the medical data in a secure manner.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 3 illustrates how a query for determining the allele from variants in the APOE gene is posed as a matrix operator in accordance with an embodiment of the present invention;

FIG. 9 illustrates the matrix multiplication algorithm of the present invention with d=3 in accordance with an embodiment of the present invention;

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

There is an increasing concern about patient privacy and the lack of protection mechanisms when using medical data (e.g., genomic data) in clinical applications. For example, human genomic data are highly sensitive due to their uniqueness and predictive value. Their leakage is irrevocable and has long-term impact on an individual's education, employment, insurance, and on their relatives. Genomic data yield unique biometrics. Merely 75 single-nucleotide polymorphisms (SNP) are sufficient to uniquely re-identify an individual and a few dozens of database queries can determine the membership of a victim. Studies show that genomic data can infer physical appearance and diseases that are linkable to anonymized phenotype records.

It is therefore of paramount importance to protect medical data, such as genomic data, hosted in clinical systems. Traditionally, clinical data are encrypted during storage (labeled "encryption at rest") as a mechanism to protect data loss. In fact, "encryption at rest" is required by HIPAA security rules. However, for genomic data, "encryption at rest" is insufficient. Genomic data must also be secured during computation because decrypting the data for computation exposes the data to a risk of breach during computation.

The principles of the present invention enable a manner in which to protect medical data, such as genomic data, hosted in clinical systems as discussed further below by encoding the medical data as vectors of a matrix, which is homomorphically encrypted using an encryption key to generate a ciphertext. After transmitting ciphertexts to the service provider, the service provider performs homomorphic matrix multiplication on the ciphertexts, the result of which is transmitted to the medical provider who decrypts the result, which matches the result of performing matrix multiplication on the unencrypted matrices.

Figure 1:
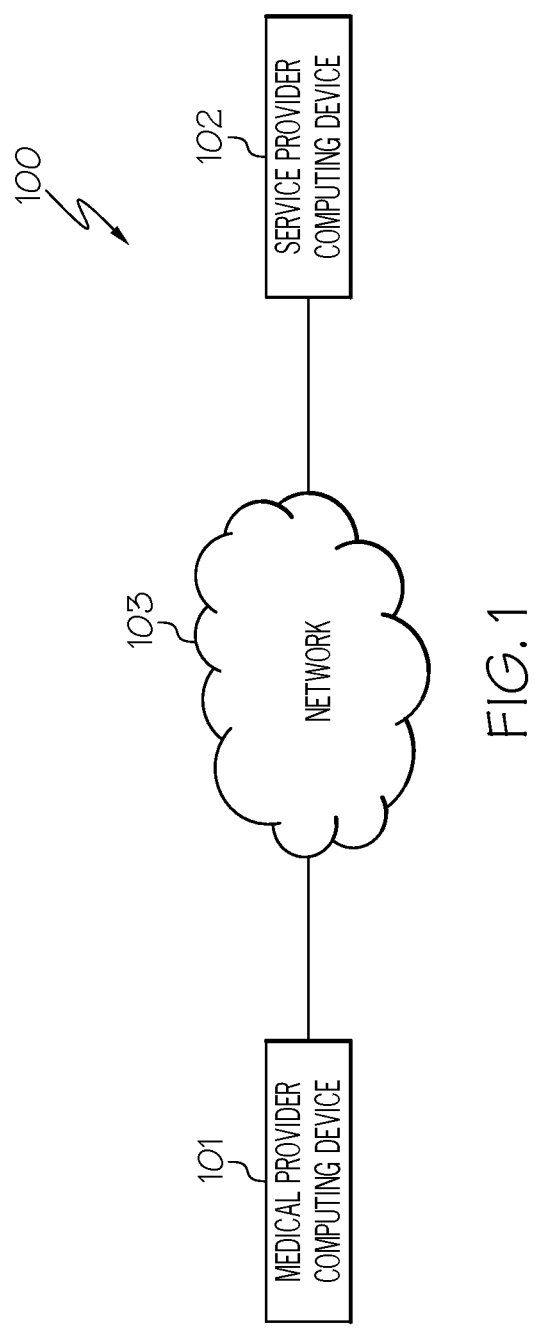
FIG. 1 illustrates an embodiment of the present invention of a communication system for practicing the principles of the present invention.

Referring now to the Figures in detail, FIG. 1 illustrates an embodiment of the present invention of a communication system 100 for practicing the principles of the present invention in accordance with an embodiment of the present invention. Communication system 100 includes a medical provider computing device 101 connected to a service provider computing device 102 via a network 103. "Medical provider computing device" 101, as used herein, refers to a computing device utilized by a health professional, healthcare institution, healthcare organization or health center. "Service provider computing device" 102, as used herein, refers to a computing device utilized by a third party, such as a cloud-based service provider that provides services to healthcare organizations (e.g., perform computations on sensitive data (e.g., patient medical data) while guaranteeing privacy by performing homomorphic matrix computations).

Such computing devices may be any type of computing device (e.g., workstation, server, virtual machine hosted on a cloud computing platform) configured with the capability of connecting to network 103 and consequently communicating with other computing devices (e.g., medical provider 101, service provider 102).

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 is not to be limited in scope to any one particular network architecture. System 100 may include any number of medical provider computing devices 101, service provider computing devices 102 and networks 103.

A description of an illustrative hardware configuration of a computing device utilized by the medical provider and/or service provider is provided below in connection with FIG. 2.

Figure 2:
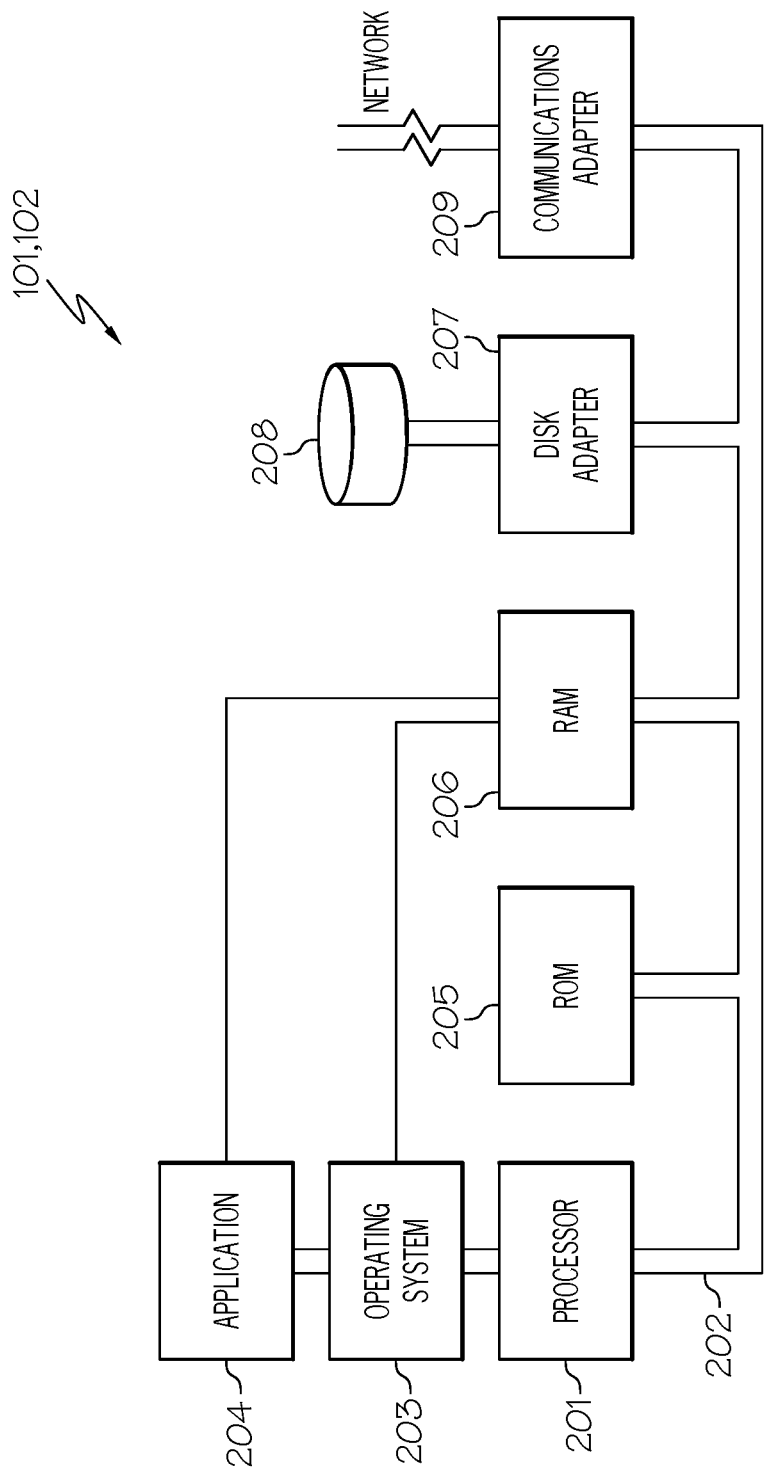
FIG. 2 illustrates an embodiment of the present invention of a hardware configuration of a computing device, utilized by the medical provider and/or service provider, which is representative of a hardware environment for practicing the present invention.

Referring now to FIG. 2, FIG. 2 illustrates a hardware configuration of medical provider computing device 101, service provider computing device 102 (FIG. 1) which is representative of a hardware environment for practicing the present invention. Referring to FIG. 2, medical provider computing device 101, service provider computing device 102 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 of service provider computing device 102 may include, for example, a program for performing computations on sensitive data while guaranteeing privacy by performing homomorphic matrix computations as discussed below in association with FIGS. 3-11. Application 204 of medical provider computing device 101 may include, for example, a program for generating ciphertexts that homomorphically encrypts matrices that includes medical data encoded as vectors as discussed below in association with FIGS. 3-11.

Referring again to FIG. 2, read-only memory ("ROM") 205 is connected to system bus 202 and includes a basic input/output system ("BIOS") that controls certain basic functions of medical provider computing device 101, service provider computing device 102. Random access memory ("RAM") 206 and disk adapter 207 are also connected to system bus 202. It should be noted that software components including operating system 203 and application 204 may be loaded into RAM 206, which may be computing device's 101, 102 main memory for execution. Disk adapter 207 may be an integrated drive electronics ("IDE") adapter that communicates with a disk unit 208, e.g., disk drive. It is noted that the program for performing computations on sensitive data while guaranteeing privacy by performing homomorphic matrix computations, as discussed below in association with FIGS. 3-11, may reside in disk unit 208 or in application 204. It is further noted that the program for generating ciphertexts that homomorphically encrypts matrices that includes medical data encoded as vectors, as discussed below in association with FIGS. 3-11, may reside in disk unit 208 or in application 204.

Medical provider computing device 101, service provider computing device 102 may further include a communications adapter 209 connected to bus 202. Communications adapter 209 interconnects bus 202 with an outside network (e.g., network 103 of FIG. 1) thereby allowing computing devices 101, 102 to communicate between each other.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed in the Background section, homomorphic encryption can be used for privacy-preserving outsourced storage and computation. This allows data to be encrypted and out-sourced to commercial cloud environments for processing, all while encrypted. In highly regulated industries, such as health care, homomorphic encryption can be used to enable new services by removing privacy barriers inhibiting data sharing. For example, predictive analytics in health care can be hard to apply due to medical data privacy concerns, but if the predictive analytics service provider can operate on encrypted data instead, these privacy concerns are diminished.

Currently though such service providers only support plaintext operations with the ciphertext. That is, such service providers evaluate an encrypted model of the plaintext data. As a result, homomorphic encryption schemes utilized by the service providers are slow and memory-intensive thereby limiting the outsourcing of sensitive data to third parties, such as a cloud service provider.

The principles of the present invention overcome such limitations by encrypting a matrix into a single ciphertext and performing arithmetic operations using the ciphertext packing method for high-throughput processing. This solution includes an efficient evaluation strategy for basic square matrix operations, such as addition and multiplication, as well as a faster rectangular matrix multiplication.

The principles of the present invention enable computations on medical data while guaranteeing patients' privacy. The service provider performing such computations learns nothing about the patients or even the computational question, if the question is encrypted. In one embodiment, the database queries to the service provider are posed as linear algebraic operators. Queries posed in this manner need not be purely logical, which is a limitation of database languages. Secondly, the principles of the present invention employ a novel technique to conduct fast matrix multiplication on homomorphically encrypted data. Query through matrix arithmetic operations enables computations to be done securely and rapidly without decryption. In addition, state-of-machine learning algorithms may now be applied (i.e., a wide range of models from logistic regression to deep neural networks use matrix arithmetic operations). It opens new opportunities to ranking and classifying based on sensitive personal medical data, which cannot be done traditionally using logic-based queries.

In one embodiment, embodiments of the present invention include three major components: (1) a service provider server; (2) a sequence encryption client (SEC); and (3) a secure query client (QC). A key generation server (KS) module generates the homomorphic encrypted (HE) parameters including the keys that are used for encryption, decryption and homomorphic evaluation. The secure service provider server has only access to the evaluation key for homomorphic computation. In Stage 1 (FIG. 5), new patient data is processed and stored. The SEC reads the files (e.g., Variant Call Format (VCF) files), normalizes data, encrypts data and sends them to the service provider server. The service provider server simply stores the ciphertext in this stage. In Stage 2 (FIG. 7), queries from clinical applications to the service provider server are answered. The queries are processed by the QC, encrypted and sent to the service provider server. The service provider server computes over encryption and returns the ciphertext results to the QC, which then decrypts them.

As discussed above, medical analysis questions can be formulated as linear algebraic expressions, such as matrix-vector multiplications. Each patient's sequence data may have two representations. The first representation, described below, encodes known variants with a goal to enable efficient computation with known variants. Examples of these computations are identifying genotypes and phenotypes. The second representation is useful for retrieving variants by position.

Figure 3:
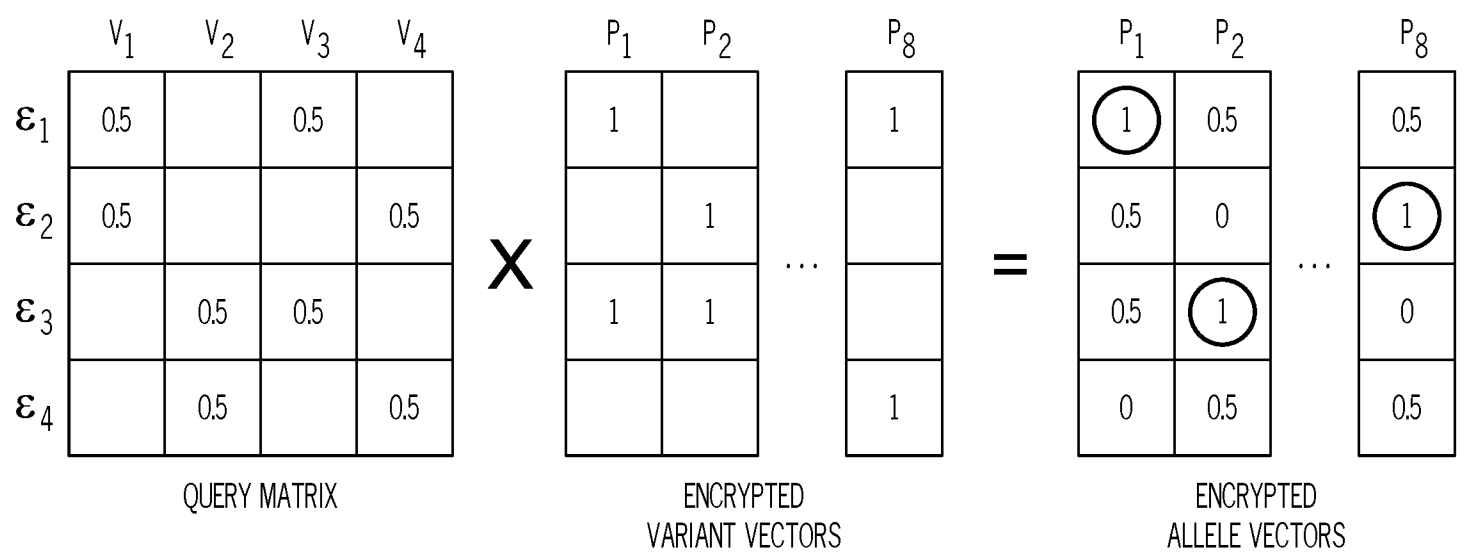

In one embodiment, in the representation of known variants, normalized medial data (e.g., VCF data) may be encoded as sparse vectors. In one embodiment, there will be one vector per gene per patient. The location of each element of the vector may represent a specific known variant. In one embodiment, the presence of the variant is indicated by a value of one, and absence is indicated by a value of zero as shown in FIG. 3. FIG. 3 illustrates how a query for determining the allele from variants in the APOE gene is posed as a matrix operator in accordance with an embodiment of the present invention. Referring to FIG. 3, the rows (labeled c) represent the alleles and the columns (labeled V) represent variants. The variant data for each patient is represented as a column-vector. Vectors from eight patients (labeled P) are horizontally concatenated so that the query is carried out on many patients in parallel. In each column of the product matrix, the element with the highest score (circled) represents the allele for that patient (e.g., patient P1 has allele $\epsilon 1$). In this illustration, the matrices are shown in plaintext; however, the variant vectors and allele vectors are in ciphertext.

Figure 4:
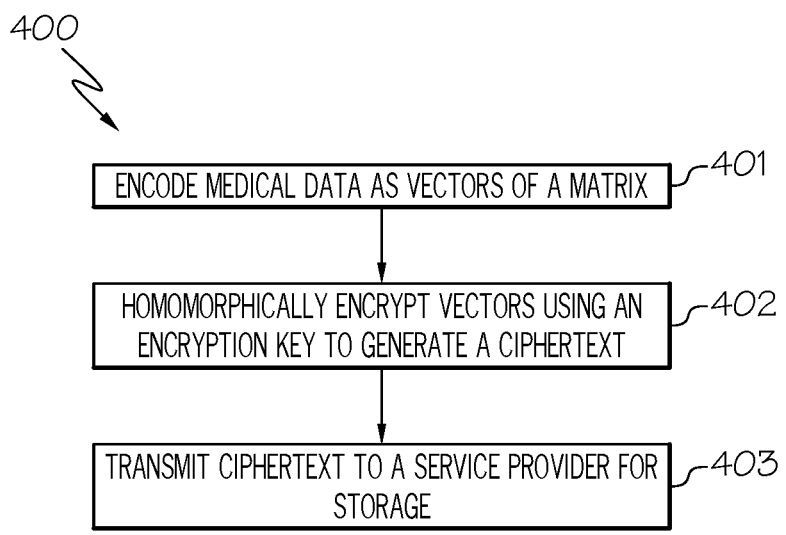
FIG. 4 is a flowchart of a method for homomorphically encrypting and storing medical data in accordance with an embodiment of the present invention.
Figure 5:
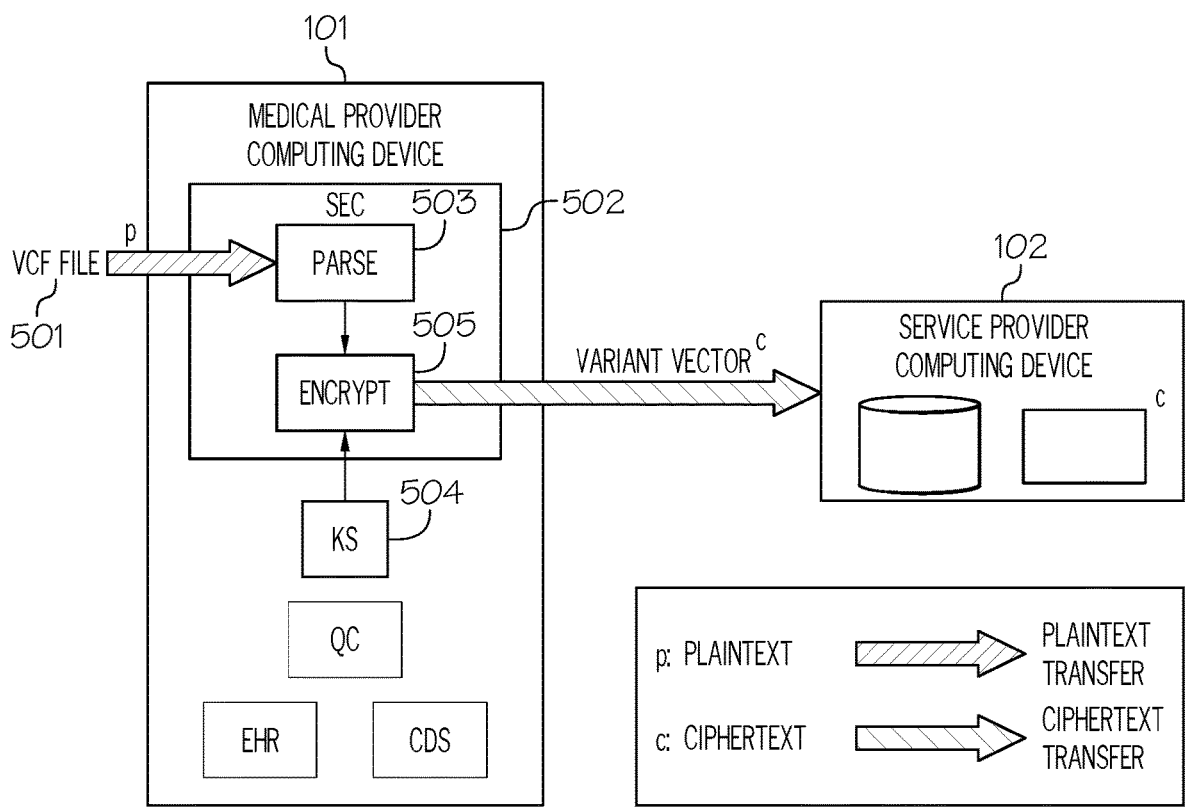
FIG. 5 is a diagram illustrating the interactions between the medical provider and the service provider in connection with homomorphically encrypting and storing medical data in accordance with an embodiment of the present invention.

Referring now to FIG. 4, FIG. 4 is a flowchart of a method 400 for homomorphically encrypting and storing medical data in accordance with an embodiment of the present invention. FIG. 5 is a diagram illustrating the interactions between the medical provider and the service provider in connection with homomorphically encrypting and storing medical data in accordance with an embodiment of the present invention. FIG. 4 will now be discussed below in connection with FIG. 5.

Referring to FIG. 4, in conjunction with FIGS. 1-3 and 5, in step 401, medical provider computing device 101 encodes medical data (e.g., VCF data) as vectors of a matrix.

In step 402, medical provider computing device 101 homomorphically encrypts the vectors using an encryption key to generate a ciphertext.

In step 403, medical provider computing device 101 transmits the ciphertext to service provider computing device 102 for storage.

A further discussion regarding method 400 is provided below.

In one embodiment, VCF files 501 are input to a sequence encryption client (SEC) 502. In one embodiment, SEC 502 will parse the VCF files 501 and pre-process the data as represented by the parser sub-module 503. Known variants will be identified, such as by filtering the genes of interest in genomic data. In one embodiment, service provider computing device 102 will store sequence data in a normalized format to perform queries efficiently. Thus, SEC 502 will perform a normalization step. These variants will be converted into a particular query format. In one embodiment, each vector will be encrypted 505 as a single ciphertext using the encryption key provided by key generation server (KS) 504.

In one embodiment, upon receiving a request for variant information, service provider computing device 102 provides the requested variant data to medical provider computing device 101 as discussed below in connection with FIG. 6.

Figure 6:
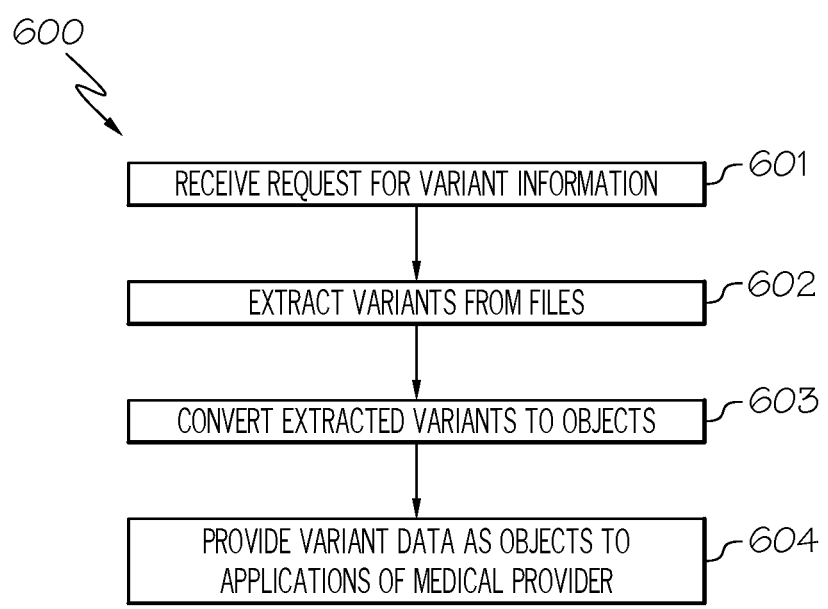
FIG. 6 is a flowchart of a method for providing variant data as objects in accordance with an embodiment of the present invention.

FIG. 6 is a flowchart of a method 600 for providing variant data as objects in accordance with an embodiment of the present invention.

Referring to FIG. 6, in conjunction with FIGS. 4 and 5, in step 601, service provider computing device 102 receives a request for variant information from medical provider computing device 101.

In step 602, service provider computing device 102 extracts the variants from the stored files (e.g., VCF files).

In step 603, service provider computing device 102 converts the extracted variants to objects.

In step 604, service provider computing device 102 provides the variant data as objects to applications of medical provider computing device 101.

A further description of method 600 is provided below.

In one embodiment, service provider computing device 102 extracts variants from the files (e.g., VCF files), feeds them to a VCF-to-FHIR (Fast Healthcare Interoperability Resources) converter, and provides the variant data as FHIR objects or resources to Clinical Decision Support (CDS) 802 (discussed further below) and other applications.

Figure 7:
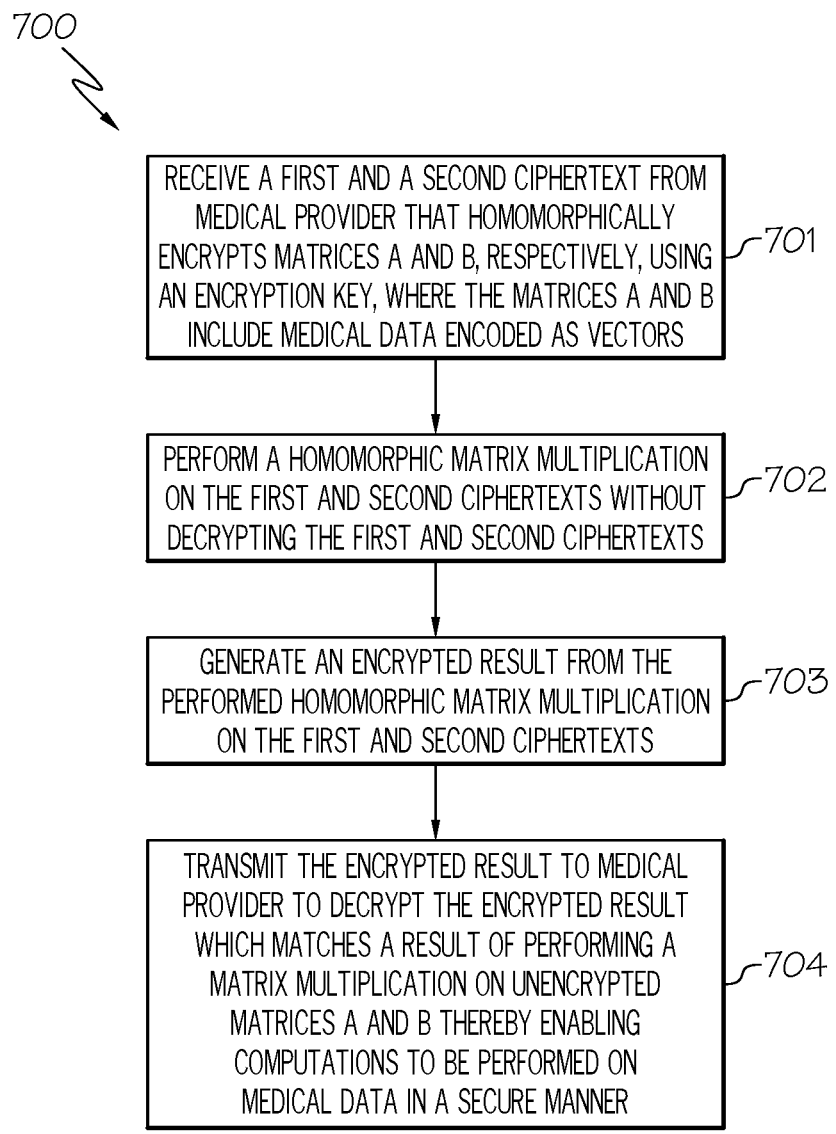
FIG. 7 is a flowchart of a method for performing computations on sensitive data while guaranteeing privacy in accordance with an embodiment of the present invention.

Referring now to FIG. 7, FIG. 7 is a flowchart of a method 700 for performing computations on sensitive data while guaranteeing privacy in accordance with an embodiment of the present invention.

Referring to FIG. 7, in conjunction with FIGS. 1-6, in step 701, service provider computing device 102 receives a first and a second ciphertext from medical provider computing device 101 that homomorphically encrypts matrices A and B, respectively, using an encryption key, where the matrices A and B include medical data encoded as vectors.

In step 702, service provider computing device 102 performs a homomorphic matrix multiplication on the first and second ciphertexts without decrypting the first and second ciphertexts. A more detail discussion regarding the homomorphic matrix multiplication algorithm is discussed below in connection with FIG. 10.

In step 703, service provider computing device 102 generates an encrypted result from the performed homomorphic matrix multiplication on the first and second ciphertexts.

In step 704, service provider computing device 102 transmits the encrypted result to medical provider computing device 101 to decrypt the encrypted result which matches a result of performing a matrix multiplication on unencrypted matrices A and B thereby enabling computations to be performed on medical data in a secure manner.

Figure 8:
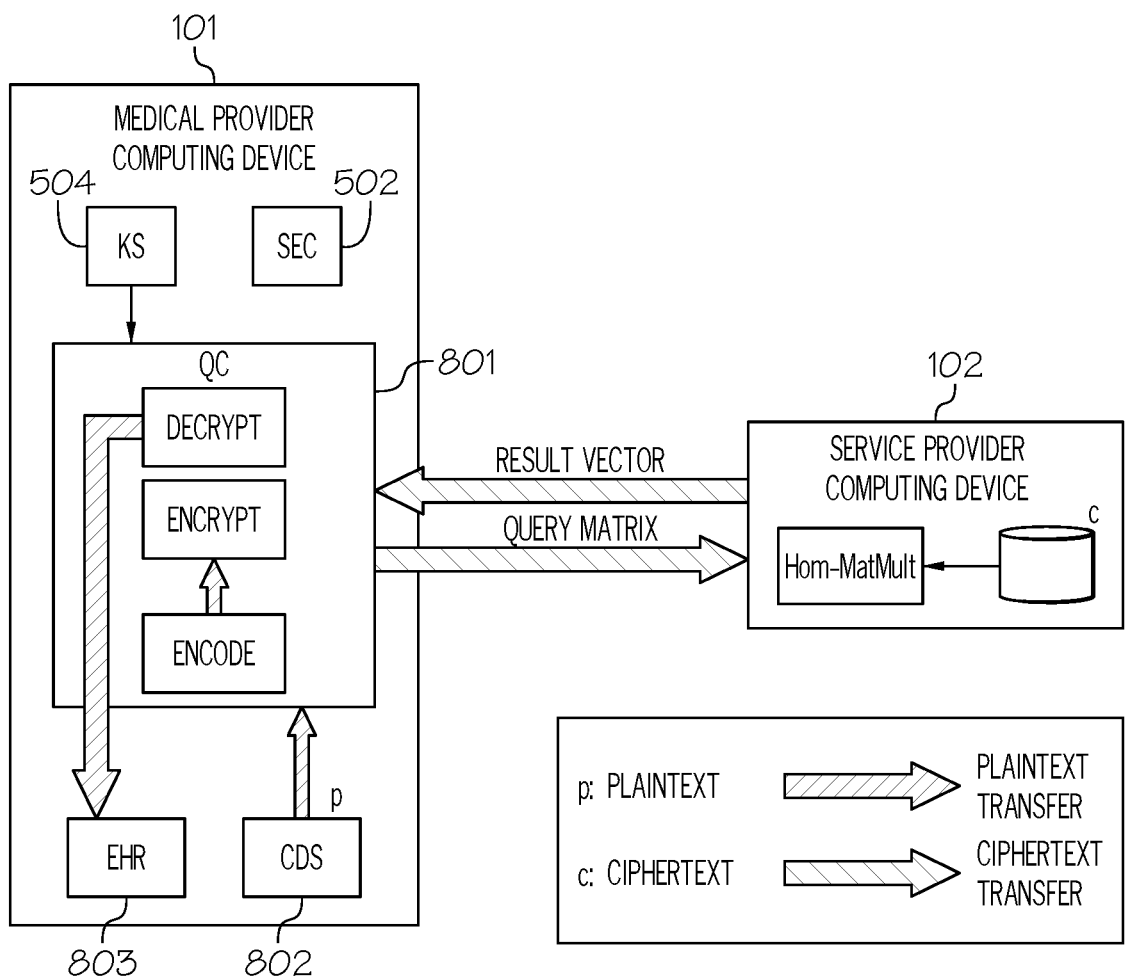
FIG. 8 is a diagram illustrating the interactions between the medical provider and the service provider in connection with the service provider performing homomorphic matrix multiplication on ciphertexts in accordance with an embodiment of the present invention.

A more detailed discussion of method 700 is provided below in connection with FIG. 8. FIG. 8 is a diagram illustrating the interactions between the medical provider and the service provider in connection with service provider computing device 102 performing homomorphic matrix multiplication on ciphertexts in accordance with an embodiment of the present invention.

Referring to FIG. 8, in conjunction with FIG. 7, in one embodiment, the query client (QC) 801 processes queries made by an application, such as a Clinical Decision Support (CDS) system 802, and sends them to service provider computing device 102. The query may be in Fast Healthcare Interoperability Resources (FHIR) format. As discussed further below, such a query may be converted into a matrix form. This matrix may be ciphertext or may be left as plaintext, depending on the use-case. The matrix is then transmitted to service provider computing device 102 for computation (homomorphic matrix multiplication ("HomMatMult")). QC 801 receives the results of the computation and decrypts the results (using the key from key generation server (KS) module 504 for decryption), formats them as FHIR resources, and returns them to the application, such as an electronic health record (EHR) application 803.

In one embodiment, service provider computing device 102 stores the medical data (e.g., genomic data) in the form of vectors, and securely computes responses to plaintext or ciphertext queries. Service provider computing device 102 performs homomorphic matrix multiplication between the query matrix and ciphertext variant vectors. Finally, service provider computing device 102 will return the ciphertext result of the computation, i.e., the allele or genotype vector to QC 801.

As previously discussed, the present invention encrypts a matrix homomorphically and performs arithmetic operations on encrypted matrices. The present invention includes a novel matrix encoding method and an efficient evaluation strategy for basic matrix operations, such as addition, multiplication, and transposition. Furthermore, as discussed below, more than one matrix can be encrypted in a single ciphertext, yielding better amortized performance.

As discussed below, the present invention performs arithmetic operations on encrypted matrices using a homomorphic encryption (HE) system. In one embodiment, such a solution requires $O(d)$ homomorphic operations to compute a product of two encrypted matrices of size d×d, compared to $O(d^2)$ of the previous best method. Basic matrix arithmetic is extended to some advanced operations: transposition and rectangular matrix multiplication. Furthermore, as discussed below, multiple matrices may be encrypted in a single ciphertext yielding a better amortized performance per matrix.

In one embodiment, the present invention performs matrix operations by combining HE-friendly operations on packed ciphertexts, such as SIMD (single instruction, multiple data) arithmetic, scalar multiplication, and slot rotation. Firstly, a simple encoding map is defined that identifies an arbitrary matrix of size d×d with a vector of dimension $n=d^2$ having the same entries. Let $\odot$ denote the component-wise product between matrices. Then matrix multiplication can be expressed as $A \cdot B = \Sigma_{i=0}^{d-1} A_i \odot B_i$ for some matrices Ai (resp. Bi) obtained from A (resp. B) by taking specific permutations. FIG. 9 describes this equality for the case of d=3 in accordance with an embodiment of the present invention. It is noted that the initial matrix $A_o$ (resp. $B_o$) can be computed with $O(d)$ rotations, and that for any $1 \leq i < d$ the permuted matrix $A_i$ (resp. $B_i$) can be obtained by $O(1)$ rotations from the initial matrix. Thus, the total computational complexity is bounded by $O(d)$ rotations and multiplications.

In one embodiment, the solution is based on the assumption that a ciphertext can encrypt $d^2$ plaintext slots, but it can be extended to support matrix computation of an arbitrary size. When a ciphertext has more than $d^2$ plaintext slots, for example, one can encrypt multiple matrices in a single ciphertext and carry out matrix operations in parallel. On the other hand, if a matrix is too large to be encoded into one ciphertext, one can partition it into several sub-matrices and encrypt them individually. An arithmetic operation over large matrices can be expressed using block-wise operations, and the computation on the sub-matrices can be securely done using the present invention.

HE is a cryptographic primitive that allows one to compute on encrypted data without decryption and generate an encrypted result which matches that of operations on plaintext. So it enables one to securely outsource computation to a public cloud.

Let M and C denote the spaces of plaintexts and ciphertexts, respectively. An HE scheme Π=(KeyGen, Enc, Dec, Eval) is a quadruple of algorithms that proceeds as follows:

KeyGen($1^\lambda$). Given the security parameter λ, this algorithm outputs a public key pk, a public evaluation key evk and a secret key sk.

$Enc_{pk}$(m). Using the public key pk, the encryption algorithm encrypts a message m∈M into a ciphertext ct∈C.

$Dec_{sk}$(ct). For the secret key sk and a ciphertext ct, the decryption algorithm returns a message m∈M.

$Eval_{evk}$(f;$ct_1$, ..., $ct_k$). Using the evaluation key evk, for a circuit f:$M^k \rightarrow M$ and a tuple of ciphertexts ($ct_1$, ..., $ct_k$), the evaluation algorithm outputs a ciphertext ct'∈C An HE scheme Π is called correct if the following statements are satisfied with an overwhelming probability:

(1) $\text{Dec}_{sk}(\text{ct})=m$ for any $m \in M$ and $\text{ct} \leftarrow \text{Enc}_{pk}(m)$.

(2) $\text{Dec}_{sk}(\text{ct}')=f(m_1, \ldots, m_k)$ with an overwhelming probability if $\text{ct}' \leftarrow \text{Eval}_{evk}(f, \text{ct}_1, \ldots, \text{ct}_k)$ for an arithmetic circuit $f: M^k \rightarrow M$ and for some ciphertexts $\text{ct}_1, \ldots, \text{ct}_k \in C$ such that $\text{Dec}_{sk}(\text{ct}_i)=m_i$.

An HE system can securely evaluate an arithmetic circuit f consisting of addition and multiplication gates. As used herein, $\text{Add}(\text{ct}_1, \text{ct}_2)$ and $\text{Mult}_{evk}(\text{ct}_1, \text{ct}_2)$ denote the homomorphic addition and multiplication between two ciphertexts $\text{ct}_1$ and $\text{ct}_2$, respectively. In addition, $\text{CMult}_{evk}(\text{ct}; u)$ denotes the multiplication of ct with a scalar $u \in M$. For simplicity, the subscript of the algorithms is omitted when it is clear from the context.

The ciphertext packing technique of the present invention allows one to encrypt multiple values into a single ciphertext and perform computation in a SIMD (single instruction, multiple data) manner.

However, the ciphertext packing technique has a limitation by not being able to easily handle a circuit with some inputs in different plain-text slots. To overcome this problem, there have been some proposed methods to move data in the slots over encryption. For example, some HE schemes based on the ring learning with errors (RLWE) assumption exploit the structure of the Galois group to implement the rotation operation on plaintext slots. That is, such HE schemes include the rotation algorithm, denoted by $\text{Rot}(\text{ct}; \ell)$, which transforms an encryption ct of $m=(m_0, \ldots, m_{n-1}) \in M=R^n$ into an encryption of $\rho(m; \ell):= (m_\ell, \ldots, m_{n-1}, m_0, \ldots, m_{\ell-1})$. It is noted that $\ell$ can be either positive or negative, and a rotation by ($\ell$) is the same as a rotation by $(n-\ell)$.

As discussed below, the present invention evaluates an arbitrary linear transformation on encrypted vectors. In general, an arbitrary linear transformation $L: R_n \rightarrow R_n$ over plaintext vectors can be represented as $L: m \rightarrow U \cdot m$ for some matrix $U \in R^{n \times n}$. The matrix-vector multiplication can be expressed by combining rotation and constant multiplication operations.

Specifically, for $0 \leq \ell < n$, the $\ell$-th diagonal vector of U is defined by $u_\ell = (U_{o,\ell}, U_{1,\ell+i}, \ldots, U_{n-\ell-1,n-1}, U_{n-\ell,0}, \ldots, U_{n-1,\ell-1}) \in R^n$. Then, one has $$U \cdot m = \sum_{0 \leq \ell < n} (u_\ell \odot \rho(m; \ell)) \quad (1)$$

where $\odot$ denotes the component-wise multiplication between vectors. Given a matrix $U \in R^{n \times n}$ and an encryption ct of the vector m, Algorithm 1 describes how to compute a ciphertext of the desired vector $U \cdot m$.

| Algorithm 1: Homomorphic Linear Transformation |
| --- |
| procedure LinTrans(ct; U) |
| 1:    ct' ← CMult(ct; u$_o$) |
| 2:    for $\ell$ = 1 to n − 1 do |
| 3:       ct' ← Add(ct', CMult(Rot(ct; $\ell$); u$_\ell$)) |
| 4:    end for |
| 5:    return ct' |

As shown in Algorithm 1, the computational cost of matrix-vector multiplication is about n additions, constant multiplications, and rotations. It is noted that the rotation operation needs to perform a key-switching operation and thus is comparably expensive than the other two operations. As a result, it can be said that the complexity is asymptotically $O(n)$ rotations. It can be reduced when the number of nonzero diagonal vectors of U is relatively small.

The discussion below proposes an encoding method to convert a matrix into a plaintext vector in a SIMD environment. Based on this encoding method, an efficient algorithm was devised to carry out basic matrix operations over encryption.

In one embodiment, for a d x d square matrix $A=(A_{i,j})$, $0 \leq i, j < d$, useful permutations $\sigma$, $\tau$, and $\psi$ are defined on the set $R^{d \times d}$. For simplicity, $Z \cap [0, d)$ is identified as a representative of $Z_d$ and write $[i]_d$ to denote the reduction of an integer i modulo d into that interval. All the indexes will be considered as integers modulo d.

$$\sigma(A)_{i,j} = A_{i,i+j}$$

$$\tau(A)_{i,j} = A_{i+j,j}$$

$$\phi(A)_{i,j} = A_{i,j+1}$$

$$\Psi(A)_{i,j} = A_{i+1,j}$$

It is noted that $\phi$ and $\psi$ represent the column and row shifting functions, respectively. Then for two square matrices A and B of order d, one can express their matrix product AB as follows:

$$A \cdot B = \sum_{k=0}^{d-1} (\phi^k \circ \sigma(A)) \odot (\psi^k \circ \tau(B)), \quad (2)$$

where $\odot$ denotes the component-wise multiplication between matrices. The correctness is shown in the following equality by computing the matrix component of the index (i,j):

$$\sum_{k=0}^{d-1} (\phi^k \circ \sigma(A))_{i,j} \cdot (\psi^k \circ \tau(B))_{i,j} = \sum_{k=0}^{d-1} \sigma(A)_{i,j+k} \cdot \tau(B)_{i+k,j}$$

$$= \sum_{k=0}^{d-1} A_{i,i+j+k} \cdot B_{i+j+k,j}$$

$$= \sum_{k=0}^{d-1} A_{i,k} \cdot B_{k,j}$$

$$= (A \cdot B)_{i,j}.$$

A row ordering encoding map is proposed to transform a vector of dimension $n=d^2$ into a matrix in $R^{d \times d}$. For a vector $a=(a_k)_{0 \leq k < n}$, the encoding map l is defined as: $R_n \rightarrow R^{d \times d}$ by l: $a \rightarrow A=(a_{d \cdot i+j})_{0 \leq i, j < d}$, i.e., a is the concatenation of row vectors of A. It is clear that $l(\cdot)$ is an isomorphism between additive groups, which implies that matrix addition can be securely computed using homomorphic addition in a SIMD manner. In addition, one can perform multiplication by scalars by adapting a constant multiplication of an HE scheme. As discussed herein, spaces $R^n$ and $R^{d \times d}$ are identified with respect to the $l(\cdot)$, so a ciphertext will be called an encryption of A if it encrypts the plaintext vector $a=l^{-1}(A)$.

An arbitrary permutation operation on $R^{d \times d}$ can be understood as a linear transformation $L: R^n \rightarrow R^n$ such that $n=d^2$. In general, its matrix representation $U \in \{0, 1\}^{n \times n} \subseteq R^{n \times n}$ has n number of nonzero diagonal vectors. So if one directly evaluates the permutations $A \rightarrow \phi^k \circ \sigma(A)$ and $B \rightarrow \psi^k \circ \tau(B)$ for $1 \leq k < d$, each of them requires $O(d^2)$ homomorphic operations and thus the total complexity is $O(d^3)$. The algorithm of the present invention to perform the matrix multiplication on packed ciphertexts is provided by combining Equation (2) and the matrix encoding map of the present invention.

The following four permutations σ, τ, ∅, and ψ are now discussed. $U^\sigma$, $U^\tau$, V, and W denote the matrix representations corresponding to these permutations, respectively. Firstly, the matrix representations $U^\sigma$ and $U^\tau$ of σ and τ are expressed as follows:

$$U^\sigma_{d \cdot i+j, \ell} = \begin{cases} 1 & \text{if } \ell = d \cdot i + [i+j]_d; \\ 0 & \text{otherwise;} \end{cases}$$

$$U^\tau_{d \cdot i+j, \ell} = \begin{cases} 1 & \text{if } \ell = d \cdot [i+j]_d + j; \\ 0 & \text{otherwise;} \end{cases}$$

for 0≤i, j<d and 0≤ $\ell$ <$d^2$. Similarly, for 1≤k<d, the matrix representations of $\emptyset^k$ and $\psi^k$ can be computed as follows:

$$V^k_{d \cdot i+j, \ell} = \begin{cases} 1 & \text{if } \ell = d \cdot i + [j+k]_d; \\ 0 & \text{otherwise;} \end{cases}$$

$$W^k_{d \cdot i+j, \ell} = \begin{cases} 1 & \text{if } \ell = d \cdot [i+k]_d + j; \\ 0 & \text{otherwise;} \end{cases}$$

for $0 \le i, j < d$ and $0 \le \ell < d^2$.

As described in Equation (1), the diagonal decomposition of the matrix representations are employed for multiplications with encrypted vectors. The number of diagonal vectors is counted to estimate the complexity. The notation $u_\ell$ is used to write the $\ell$-th diagonal vector of a matrix U. For simplicity, $u_{d2-\ell}$ is identified with $u_{-\ell}$. The matrix $U^\sigma$ has exactly (2d-1) number of nonzero diagonal vectors, denoted by $u_k^\sigma$ for k∈Z∩(-d, d). The $\ell$-th diagonal vector of $U^\tau$ is nonzero if and only if $\ell$ is divisible by the integer d, so $U^\tau$ has d nonzero diagonal vectors. For any 1≤k<d, the matrix $V^k$ has two nonzero diagonal vectors $v_k$ and $v_{k-d}$. Similarly, the matrix $W^k$ has the only nonzero diagonal vector $w_{d-k}$. Therefore, homomorphic evaluations of the permutations σ and τ require O(d) rotations while it takes O(1) rotations to compute $\psi^k$ or $\emptyset^k$ for any 1≤k<d.

As discussed above, a more detail discussion regarding the homomorphic matrix multiplication algorithm is discussed below in connection with FIG. 10.

Figure 10:
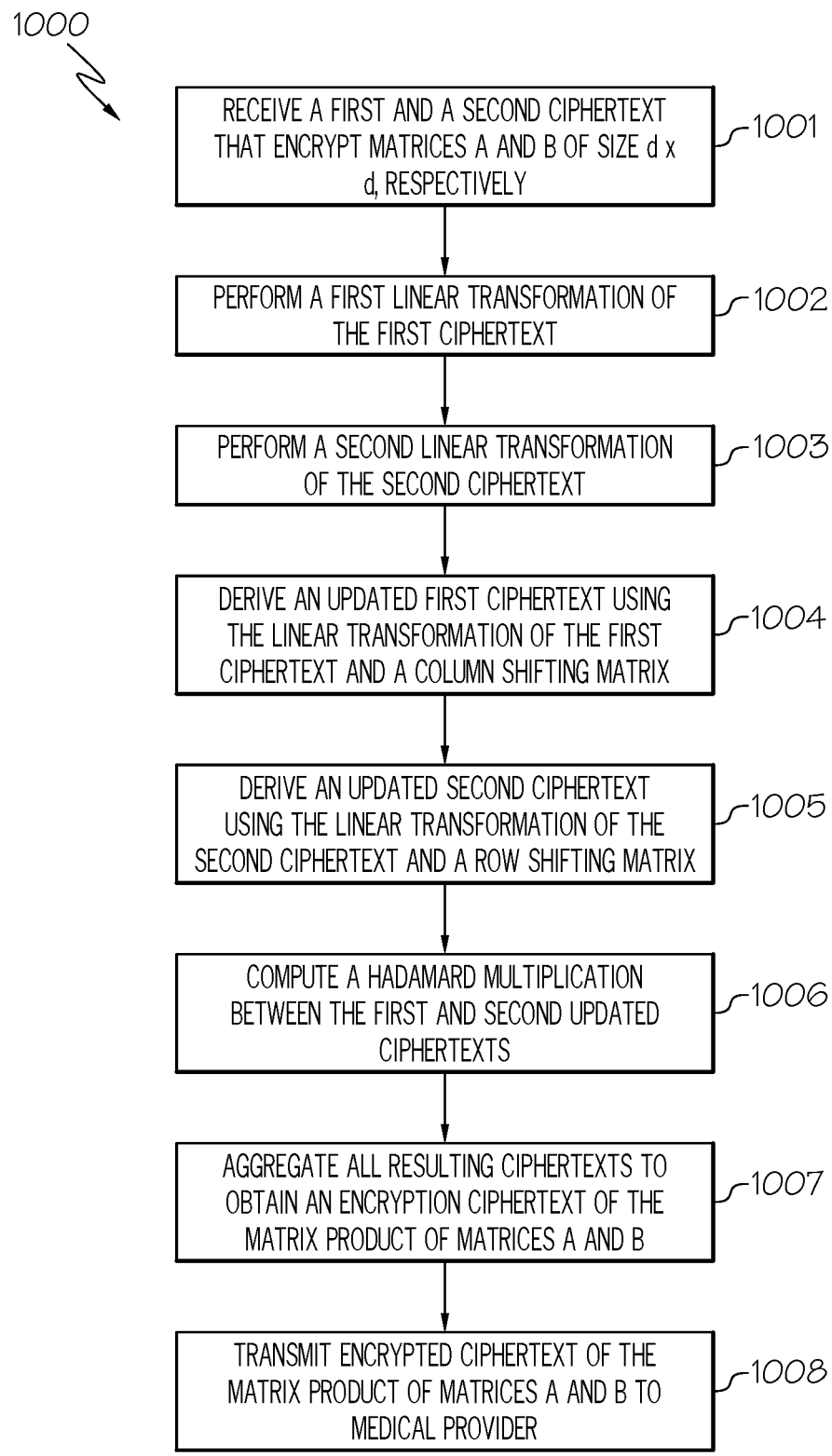
FIG. 10 is a flowchart of a method for performing homomorphic matrix multiplication in accordance with an embodiment of the present invention.

FIG. 10 is a flowchart of a method 1000 for performing homomorphic matrix multiplication in accordance with an embodiment of the present invention.

Referring to FIG. 10, in conjunction with FIG. 7, in step 1001, service provider computing device 102 receives a first and a second ciphertext that encrypt matrices A and B of size d×d, respectively.

In step 1002, service provider computing device 102 performs a first linear transformation of the first ciphertext.

In step 1003, service provider computing device 102 performs a second linear transformation of the second ciphertext.

In step 1004, service provider computing device 102 derives an updated first ciphertext using the linear transformation of the first ciphertext and a column shifting matrix.

In step 1005, service provider computing device 102 derives an updated second ciphertext using the linear transformation of the second ciphertext and a row shifting matrix.

In step 1006, service provider computing device 102 computes a Hadamard multiplication between the first and second updated ciphertexts.

In step 1007, service provider computing device 102 aggregates all resulting ciphertexts to obtain an encryption ciphertext of the matrix product of matrices A and B.

In step 1008, service provider computing device 102 transmits the encrypted ciphertext of the matrix product of matrices A and B to medical provider computing device 101.

A more detailed discussion of method 1000 is provided below.

Suppose that one is given two ciphertexts ct.A and ct.B that encrypt matrices A and B of size d×d, respectively. The following describes an efficient evaluation strategy for homomorphic matrix multiplication.

Step 1: This step performs the linear transformation $U^\sigma$ on the input ciphertext ct.A. As mentioned above, the matrix $U^\sigma$ is a sparse matrix with (2d-1) number of nonzero diagonal vectors $u_k^\sigma$ for k∈Z∩(-d, d), so one can represent the linear transformation as $$U^\sigma \cdot a = \sum_{-d<k<d} (u_k^\sigma \odot \rho(a; k)) \quad (3)$$

where $a=i^{-1}(A) \in R^n$ is the vector representation of A. If k≥0, the k-th diagonal vector is computed by $$u_k^\sigma[\ell] = \begin{cases} 1 & \text{if } 0 \le \ell - d \cdot k < (d-k); \\ 0 & \text{otherwise,} \end{cases}$$

where $u_k^\sigma[\ell]$ denotes the $\ell$ th component of $u_k^\sigma$. In the other cases k<0, it is computed by $$u_k^\sigma[\ell] = \begin{cases} 1 & \text{if } -k \le \ell - (d+k) \cdot d < d; \\ 0 & \text{otherwise,} \end{cases}$$

Then Equation (3) can be securely computed as $$\sum_{-d<k<d} CMult(Rot(ct \cdot A; k); u_k^\sigma).$$

resulting the encryption of the plaintext vector $U^\sigma \cdot a$, denoted by $ct.A^{(0)}$. Thus, the computational cost is about 2d additions, constant multiplications, and rotations.

Step 2: This step is to evaluate the linear transformation $U^\tau$ on the input ciphertext ct.B. As described above, the matrix $U^\tau$ has d nonzero diagonal vectors so one can express this matrix-vector multiplication as $$U^\tau \cdot b = \sum_{0 \le k < d} (u_{d \cdot k}^\tau \odot \rho(b; d \cdot k)), \quad (4)$$

where $b=i^{-1}(B)$ and $u_{d \cdot k}^\tau$ is the (d·k)-th diagonal vector of the matrix $U^\tau$. It is noted that for any 0≤k<d, the vector $u_{d \cdot k}^\tau$ contains one in the (k+d·i)-th component for 0≤i<d and zeros in all the other entries. Then Equation (4) can be securely computed as $$\sum_{0 \le k < d} CMult(Rot(ct \cdot B; d \cdot k); u_{d \cdot k}^\tau),$$

resulting in the encryption of the plaintext vector $U^\tau \cdot b$, denoted by ct.$B^{(0)}$. The complexity of this procedure is roughly half of the Step 1: d additions, constant multiplications, and rotations.

Step 3: This step securely computes the column and row shifting operations of $\tau(A)$ and $\tau(B)$, respectively. For $1 \leq k < d$, the column shifting matrix $V^k$ has two nonzero diagonal vectors $V_k$ and $V_{k-d}$ that are computed by $$v_k[\ell] = \begin{cases} 1 & \text{if } 0 \leq [\ell]_d < (d-k); \\ 0 & \text{otherwise;} \end{cases}$$

$$v_{k-d}[\ell] = \begin{cases} 1 & \text{if } (d-k) \leq [\ell]_d < d; \\ 0 & \text{otherwise.} \end{cases}$$

Then one gets an encryption ct.$A^{(k)}$ of the matrix $\varphi^k \circ \sigma(A)$ by adding two ciphertexts CMult(Rot(ct.$A^{(0)}$; k); $v_k$) and CMult (Rot(ct.$A^{(0)}$; k−d); $v_{k-d}$). In the case of the row shifting permutation, the corresponding matrix $W^k$ has exactly one nonzero diagonal vector $w_{d\cdot k}$ whose entries are all one. Thus, one can obtain an encryption of the matrix $\varphi^k \circ \tau(B)$ by computing ct.$B^{(k)} \leftarrow$ Rot(ct.$B^{(0)}$; d·k). The computational cost of this procedure is about d additions, 2d constant multiplications, and 3d rotations.

Step 4: This step computes the Hadamard multiplication between the ciphertexts ct.$A^{(k)}$ and ct.$B^{(k)}$ for $0 \leq k < d$, and finally aggregates all the resulting ciphertexts. As a result, one can obtain an encryption ct.AB of the matrix AB. The running time of this step is d homomorphic multiplications and additions.

In one embodiment, the standard method of homomorphic multiplication consists of two steps: raw multiplication and key-switching. In one embodiment, the first step computes the product of two input ciphertexts and returns a ciphertext, which is decryptable under the square of the secret key. Afterwards, the key-switching procedure transforms the resulting ciphertext into a normal ciphertext encrypting the same messages with the original secret key. A naïve approach for performing step 4 is to compute homomorphic multiplication operation for each pair of ct.$A^k$ and ct.$B^k$ and then add the resulting d many ciphertexts. In this case, it takes d raw multiplications and d key-switching operations. In one embodiment, the complexity can be reduced by the following procedures: (1) performing each raw multiplication operation on the input ciphertexts ct.$A^k$ and ct.$B^k$; (2) adding the resulting ciphertexts; and (3) performing only one key-switching operation to the output ciphertext. As a result, the number of key-switching operations is reduced to one.

In summary, one can perform the homomorphic matrix multiplication operation as described in Algorithm 2.

---

Algorithm 2: Homomorphic Matrix Multiplication procedure HE-MatMult(ct.A, ct.B)
[Step 1]:
1:   ct.$A^{(0)} \leftarrow$ LinTrans(ct.A; $U^\sigma$)
[Step 2]:
2:   ct.$B^{(0)} \leftarrow$ LinTrans(ct.B; $U^\tau$)
[Step 3]:
3:   for k = 1 to d − 1 do
4:     ct.$A^{(k)} \leftarrow$ LinTrans(ct.$A^{(0)}$; $V^k$)
5:     ct.$B^{(k)} \leftarrow$ LinTrans(ct.$B^{(0)}$; $W^k$)
6:   end for
[Step 4]:

---

Algorithm 2: Homomorphic Matrix Multiplication

7:   ct.AB $\leftarrow$ Mult(ct.$A^{(0)}$, ct.$B^{(0)}$)
8:   for k = 1 to d − 1 do
9:     ct.AB $\leftarrow$ Add(ct.AB, Mult(ct.$A^{(k)}$, ct.$B^{(k)}$))
10:  end for
11:  return ct.AB

---

Upon receiving the encrypted ciphertext of the matrix product of matrices A and B, medical provider computing device 101 decrypts the received encrypted ciphertext of the matrix product of matrices A and B as discussed below in connection with FIG. 11.

Figure 11:
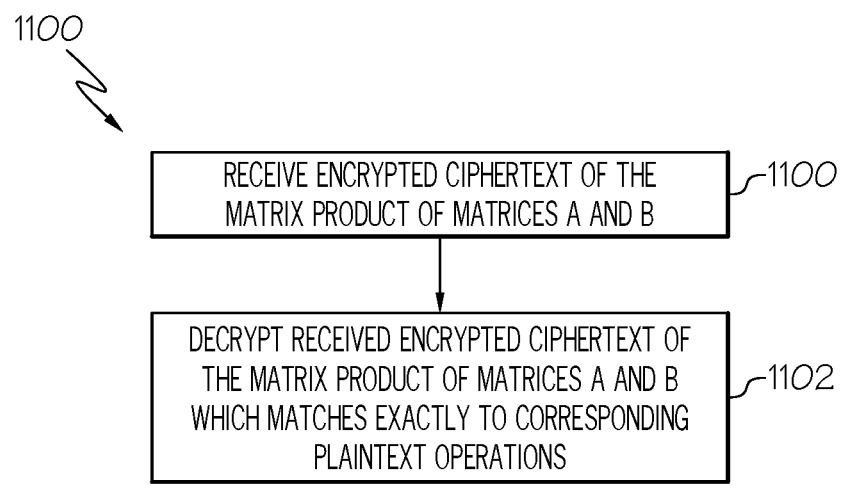
FIG. 11 is a flowchart of a method for receiving and decrypting the encrypted ciphertext of the matrix product of matrices A and B in accordance with an embodiment of the present invention.

FIG. 11 is a flowchart of a method 1100 for receiving and decrypting the encrypted ciphertext of the matrix product of matrices A and B in accordance with an embodiment of the present invention.

Referring to FIG. 11, in conjunction with FIG. 1-, in step 1101, medical provider computing device 101 receives the encrypted ciphertext of the matrix product of matrices A and B as discussed above in connection with step 1008 of method 1000.

In step 1102, medical provider computing device 101 decrypts the received encrypted ciphertext of the matrix product of matrices A and B which matches exactly to corresponding plaintext operations.

A discussion regarding further improvements concerning homomorphic matrix multiplication is now deemed appropriate.

This implementation of matrix multiplication takes about 5d additions, 5d constant multiplications, 6d rotations, and d multiplications. The complexity of Steps 1 and 2 can be reduced by applying the idea of baby-step/giant-step algorithm. Given an integer $k \in (-d, d)$, one can write $k = \sqrt{d} \cdot i + j$ for some $-\sqrt{d} < i < \sqrt{d}$ and $0 \leq j < \sqrt{d}$. Equation (3) can be expressed as $$U^\sigma \cdot a = \sum_{\substack{-\sqrt{d} < i < \sqrt{d} \\ 0 \leq j < \sqrt{d}}} \left( u^\sigma_{\sqrt{d} \cdot l + j} \odot \rho(a; \sqrt{d} \cdot i + j) \right)$$

$$= \sum_{-\sqrt{d} < i < \sqrt{d}} \rho\left( \sum_{0 \leq j < \sqrt{d}} a_{i,j}; \sqrt{d} \cdot i \right)$$

where $a_{i,j} = \rho(u_{\sqrt{d}i+j}^\sigma - \sqrt{d} \cdot i) \lfloor \rho(a;j)$. Encryptions of baby-step rotations $\rho(a;j)$ for $0 \leq i < \sqrt{d}$ are computed. They are used to compute the ciphertexts of $a_j$'s using only constant multiplications. After that, $\sqrt{d}$ additions, $\sqrt{d}$ constant multiplications, and a single rotation are performed for each i. In total, step 1 can be homomorphically evaluated with 2d additions, 2d constant multiplications, and $3\sqrt{d}$ rotations. Step 2 can be computed in a similar way using d additions, d constant multiplications, and $\sqrt{d}$ rotations.

On the other hand, one can further reduce the number of constant multiplications in step 3 by leveraging two-input multiplexers. The sum of $\rho(v_k;-k)$ and $\rho(v_{k-d}; d-k)$ generates a plaintext vector that has 1's in all the slots, which implies that $$CMult(Rot(ct \cdot A^{(0)}; k-d); v_{k-d}) =$$

$$Rot(CMult(ct \cdot A^{(0)}; \rho(v_{k-d}; d-k)); k-d) =$$

$$Rot(ct \cdot A^{(0)} - CMult(ct \cdot A^{(0)}; \rho(v_k, -k)); k-d).$$

For each $1 \leq k < d$, $CMult(ct.A^{(0)}; \rho(v_k,-k))$ is computed. Then, using the fact that $CMult(Rot(ct.A^{(0);k)};v_k)=Rot(CMult(ct.A^{(0)}; \rho(v_k,-k));k)$, one can obtain the desired ciphertext $ct.A^{(k)}$ with addition and rotation operations.

Table 1 summarizes the complexity and the required depth of each step of Algorithm 2 with the proposed optimization techniques.

TABLE 1

Complexity and Required Depth of Algorithm 2

| Step | Add. | CMult | Rot | Mult | Depth |
|---|---|---|---|---|---|
| 1-1 | 2d | 2d | $3\sqrt{d}$ | — | 1 CMult |
| 1-2 | d | d | $2\sqrt{d}$ | — | |
| 2 | 2d | d | 3d | — | 1 CMult |
| 3 | d | — | — | d | 1 Mult |
| Total | 6d | 4d | $3d + 5\sqrt{d}$ | d | 1 Mult + 2 CMult |

The following discusses advanced homomorphic matrix computations.

Furthermore, the following description introduces a method to transpose a matrix over an HE system. The following description also presents a faster rectangular matrix multiplication by employing the ideas from Algorithm 2. Furthermore, the algorithms of the present invention can be extended to parallel matrix computation without additional cost.

With respect to matrix transposition on packed ciphertexts, let $U^t$ be the matrix representation of the transpose map $A \rightarrow A^t$ on $R^{D \times D} \cong R^n$. For $0 \leq i,j < d$, its entries are given by $$U^i_{d \cdot i+j,k} = \begin{cases} 1 & \text{if } k = d \cdot j + l; \\ 0 & \text{otherwise.} \end{cases}$$

The k-th diagonal vector of $U^t$ is nonzero if and only if $k=(d-1) \cdot i$ for some $i \in Z \cap (-d,d)$, so the matrix $U^t$ is a sparse matrix with $(2d-1)$ nonzero diagonal vectors. This linear transformation can be represented as $$U^t \cdot a = \sum_{-d<t<d} (t_{(d-1) \cdot t} \odot \rho(a; (d-1) \cdot l))$$

where $^t(d-1) \cdot \ell$ denotes the nonzero diagonal vector of $U^t$. The $\ell$-th component of the vector $^t(d-1) \cdot \ell$ is computed by $$t_{(d-1)i}[\ell] = \begin{cases} 1 & \text{if } \ell - i = (d+1) \cdot j, 0 \leq j < d-i; \\ 0 & \text{otherwise,} \end{cases}$$

if $i \geq 0$, or $$t_{(d-1)i}[\ell] = \begin{cases} 1 & \text{if } \ell - i = (d+1) \cdot j, -i \leq j < d; \\ 0 & \text{otherwise,} \end{cases}$$

if $i<0$. The total computational cost is about 2d rotations and the baby-step/giant-step approach can be used to reduce the complexity; the number of automorphism can be reduced down to $3\sqrt{d}$.

With respect to rectangular matrix multiplication, an efficient algorithm is designed for rectangular matrix multiplication, such as $R^{\ell \times d} \times R^{d \times d} \rightarrow R^{\ell \times d}$ or $R^{d \times d} \times R^{d \times \ell} \rightarrow R^{d \times \ell}$. For convenience, consider the former case that A has a smaller number of rows than columns (i.e., $\ell < d$). A naïve solution is to generate a square matrix by padding zeros in the bottom of the matrix A and perform the homomorphic matrix multiplication algorithm discussed above, resulting in running time of O(d) rotations and multiplications. However, one can further optimize the complexity by manipulating its matrix multiplication representation using a special property of permutations described above.

Some refinements of rectangular matrix multiplication include the following. Suppose one receives an $\ell \times d$ matrix A and a d×d matrix B such that $\ell$ divides d. Since σ and ø are defined as row-wise operations, the restrictions to the rectangular matrix A are well-defined permutations on A. By abuse of notation, the same symbols σ and ø are used to denote the restrictions. $C_{\ell_1,\ell_2}$ are also used to denote the $(\ell_2 - \ell_1) \times d$ submatrix of C formed by extracting from $\ell_1$-th row to the $(-\ell_2-1)$-th row of C. Then their matrix product AB has shape $\ell \times d$ and it can be expressed as follows:

$$A \cdot B = \sum_{0 \leq k < d} (\phi^k \circ \sigma(A)) \odot ((\psi^k \circ \tau(B))_{0,\ell})$$

$$= \sum_{0 \leq i < \ell} \sum_{0 \leq j < d/\ell} (\phi^{j\ell+i} \circ \sigma(A)) \odot ((\psi^{j\ell+i} \circ \tau(B))_{0,\ell}).$$

A key observation is the following lemma, which gives an idea of a faster rectangular matrix multiplication algorithm.

LEMMA 4.1, Two permutations σ and ø are commutative. In general, one has $\phi^k \circ \sigma = \sigma \circ \phi^k$ for k>0. Similarly, one can obtain $\psi^k \circ \tau = \tau \circ \psi^k$ for k>0.

Now a d×d matrix $\overline{A}$ is defined containing $(d/\ell)$ copies of A in a vertical direction (i.e., $\overline{A}=A; \ldots; A)$). Lemma 4.1 implies that $$(\phi^i \circ \sigma(\overline{A}))_{j\ell \cdot (j+1)\ell} = \phi^i \circ (\sigma(\overline{A})_{j\ell \cdot (j+1)\ell})$$

$$= \phi^i \circ \sigma \circ \phi^{j\ell}(A)$$

$$= \phi^{j\ell+i} \circ \sigma(A).$$

Similarly, using the commutative property of τ and ψ, it follows $$(\psi^j \circ \tau(\overline{B}))_{i\ell,(j+1)\ell} = (\psi^{j\ell+i} \circ \tau(\overline{B}))_{0,\ell}.$$

Therefore, the matrix product AB is written as follows:

$$A \cdot B = \sum_{0 \le j < d/\ell} \left( \sum_{0 \le i < \ell} (\phi^i \circ (\sigma(\overline{A})) \odot (\psi^i \circ \tau(B)) \right)_{j \cdot \ell \cdot (j+1) \cdot \ell}$$

With respect to homomorphic rectangular matrix multiplication, suppose that two ciphertexts ct. $\overline{A}$ and ct.B are received that encrypt matrices $\overline{A}$ and B, respectively. The baby-step/giant-step algorithm is first applied to generate the encryptions of $\sigma(\overline{A})$ and $\tau(B)$ as previously discussed. Next, one can securely compute $\sum_{i=0}^{\ell-1}(\phi^i \circ \sigma(\overline{A})) \odot (\psi^i \circ \tau(B))$ in a similar way to Algorithm 2, say the output is ct. $\overline{AB}$. Finally, one can perform aggregation and rotation operations to get the final result: $\sum_{j=0}^{d/\ell-1} \text{Rot}(\text{ct}.\overline{AB}; j \cdot \ell \cdot d)$. This step can be evaluated using a repeated doubling approach, yielding a running time of $\log(d/\ell)$ additions and rotations. An explicit description of homomorphic rectangular matrix multiplication is shown below as Algorithm 3.

---
Algorithm 3 Homomorphic rectangular matrix multiplication
---

```
procedure HE-RMatMult(ct.A, ct.B)
    [Step 1]:
1:    ct.A⁽⁰⁾←LinTrans(ct.Ā; U^σ)
2:    ct.B⁽⁰⁾←LinTrans(ct.B; U^τ)
    [Step 2]:
3:    for k = 1 to ℓ −1 do
4:        ct.A⁽ᵏ⁾←LinTrans(ct.A⁽⁰⁾; V^k)
5:        ct.B⁽ᵏ⁾←LinTrans(ct.B⁽⁰⁾; W^k)
6:    end for
    [Step 3]:
7:    ct.ĀB←Mult(ct.A⁽⁰⁾, ct.B⁽⁰⁾)
8:    for k = 1 to ℓ − 1 do
9:        ct.ĀB←Add(ct.ĀB, Mult(ct.A⁽ᵏ⁾, ct.B⁽ᵏ⁾))
10:   end for
    [Step 4]:
11:   ct.AB←ct.ĀB
12:   for k = 0 to log(d/ℓ) − 1 do
13:       ct.AB←Add(ct.AB, Rot(ct.AB; ℓ · d · 2^k))
14:   end for
15:   return ct.AB
```

Table 2 summarizes the total complexity of Algorithm 3. Even though one may need an additional computation for Step 4, one can reduce the complexities of Steps 2 and 3 to $O(\ell)$ rotations and $\ell$ multiplications, respectively. It is also noted that the final output ct.AB encrypts a d×d matrix containing $(d/\ell)$ copies of the desired matrix product AB in a vertical direction.

TABLE 2

Complexity of Algorithm 3

| Step | Add | CMult | Rot | Mult |
|---|---|---|---|---|
| 1 | 3d | 3d | 5√d | — |
| 2 | ℓ | 2ℓ | 3ℓ | — |
| 3 | ℓ | — | — | ℓ |
| 4 | log(d/ℓ) | — | log(d/ℓ) | |
| Total | 3d + 2ℓ + log(d/ℓ) | 3d + 2ℓ | 3ℓ + 5√d + log(d/ℓ) | ℓ |

This resulting ciphertext has the same form as a rectangular input matrix of Algorithm 3 so it can be reusable for further matrix computation without additional cost.

The following discusses parallel matrix computation. Previously, the message space $M = R^n$ has been identified with the set of matrices $R^{d \times d}$ under the assumption that $n = d^2$. However, most of the HE schemes have a quite large number of plaintext slots (e.g., thousands) compared to the matrix dimension in some real-world applications, i.e., $n \gg d^2$. If a ciphertext can encrypt only one matrix, most of plaintext slots would be wasted. The following introduces an idea that allows multiple matrices to be encrypted in a single ciphertext thereby performing parallel matrix computation in an SIMD manner.

For simplicity, one can assume that n is divisible by $d^2$ and let $g = n/d^2$. The encoding map is modified as discussed above to make a 1-to-1 correspondence $l_g$ between $R^n$ and $(R^{d \times d})^g$, which transforms an n-dimensional vector into a g-tuple of square matrices of order d. Specifically, for an input vector $a = (a_\ell)_{0 \le \ell < r}$, $l_g$ is defined by $$l_g : a \to (A_k = (a_{g \cdot (d \cdot i + j) + k}))_{0 \le k < g}$$

The components of a with indexes congruent to k modulo g are corresponding to the k-th matrix $A_k$.

It is noted that for an integer $0 \le \ell < d^2$, the rotation operation $\rho(a; g \cdot \ell)$ represents the matrix-wise rotation by $\ell$ positions. It can be naturally extended to the other matrix-wise operations including scalar linear transformation and matrix multiplication. For example, one can encrypt g number of d×d matrices into a single ciphertext and perform the matrix multiplication operations between g pairs of matrices at once by applying the matrix multiplication algorithm of the present invention on two ciphertexts. The total complexity remains the same as Algorithm 2, which results in a less amortized computational complexity of $O(d/g)$ per matrix.

In this manner, the embodiments of the present invention are able to perform computations on sensitive data while guaranteeing privacy by performing homomorphic matrix computations.

The present invention has particular utility involving financial and medical data in that it successfully addresses privacy concerns that are currently inhibiting data sharing thus facilitating, among others, predictive analytics in such fields. However, it can also be used to manage images, medical or otherwise, thus maintaining data privacy and facilitating medical image classification, analysis of medical diagnosis using, for example, datasets regarding breast cancer, diabetes, liver disease, and malaria, as well as the application of neural network based machine learning techniques, such as deep learning and its variants.

Furthermore, the present invention improves the technology or technical field involving data security, such as using homomorphic encryption.

As discussed above, homomorphic encryption can be used for privacy-preserving outsourced storage and computation. This allows data to be encrypted and out-sourced to commercial cloud environments for processing, all while encrypted. In highly regulated industries, such as health care, homomorphic encryption can be used to enable new services by removing privacy barriers inhibiting data sharing. For example, predictive analytics in health care can be hard to apply due to medical data privacy concerns, but if the predictive analytics service provider can operate on encrypted data instead, these privacy concerns are diminished. Currently though such service providers only support plaintext operations with the ciphertext. That is, such service providers evaluate an encrypted model of the plaintext data. As a result, homomorphic encryption schemes utilized by the service providers are slow and memory-intensive thereby limiting the outsourcing of sensitive data to third parties, such as a cloud service provider.

The present invention improves such technology by enabling service providers to conduct matrix operations on encrypted data to output encrypted results, which when decrypted, match exactly that of the corresponding plaintext operations. In particular, the service provider will store normalized medical data in ciphertext. The service provider will receive analysis requests, perform homomorphic matrix multiplication on the ciphertexts and return the ciphertext results. Since the service provider does not have the encryption or decryption keys, the data's privacy cannot be breached. Homomorphic encryption enables securely outsourcing the storage and computation of medical data to a cloud-based service provider. A cloud-based service provider removes barriers for healthcare organizations in delivering precision medicine. It allows precision medicine-based clinical care to stay current with the very rapid evolution in sequencing technologies, data formats and research and best practice recommendations. Furthermore, smaller healthcare organizations, including those in rural areas, can subscribe to a secure service in the cloud, empowering them to deliver precision-medicine, without requiring large investments in this technology. In this manner, there is an improvement in the technical field of data security as well as an improvement in delivering precision-medicine.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for performing computations on sensitive data while guaranteeing privacy, the method comprising:
   receiving a first and a second ciphertexts from a medical provider that homomorphically encrypts matrices A and B, respectively, using an encryption key, wherein said matrices A and B comprise medical data encoded as vectors;
   performing a homomorphic matrix multiplication on said first and second ciphertexts without decrypting said first and second ciphertexts;
   generating an encrypted result from said performed homomorphic matrix multiplication on said first and second ciphertexts; and
   transmitting said encrypted result to said medical provider to decrypt said encrypted result which matches a result of performing a matrix multiplication on unencrypted matrices A and B thereby enabling computations to be performed on said medical data in a secure manner.

2. The method as recited in claim 1, wherein said homomorphic matrix multiplication comprises:
   performing a first linear transformation of said first ciphertext;
   performing a second linear transformation of said second ciphertext;
   deriving an updated first ciphertext using said first linear transformation of said first ciphertext and a column shifting matrix;
   deriving an updated second ciphertext using said second linear transformation of said second ciphertext and a row shifting matrix; and
   computing a Hadamard multiplication between said first and second updated ciphertexts.

3. The method as recited in claim 2, wherein said homomorphic matrix multiplication further comprises:
   aggregating all resulting ciphertexts to obtain an encrypted ciphertext of a matrix product of said matrices A and B; and
   transmitting said encrypted ciphertext of said matrix product of said matrices A and B to said medical provider.

4. The method as recited in claim 1, wherein said first ciphertext encrypts said matrix A and one or more other matrices.

5. The method as recited in claim 1 further comprising:
   receiving a request for variant information;
   extracting variants from said medical data encoded as vectors; and
   converting said extracted variants to objects.

6. The method as recited in claim 5 further comprising:
   transmitting said objects to applications of said medical provider.

7. A computer program product for performing computations on sensitive data while guaranteeing privacy, the computer program product comprising one or more computer readable storage mediums having program code embodied therewith, the program code comprising programming instructions for:
   receiving a first and a second ciphertexts from a medical provider that homomorphically encrypts matrices A and B, respectively, using an encryption key, wherein said matrices A and B comprise medical data encoded as vectors;
   performing a homomorphic matrix multiplication on said first and second ciphertexts without decrypting said first and second ciphertexts;
   generating an encrypted result from said performed homomorphic matrix multiplication on said first and second ciphertexts; and
   transmitting said encrypted result to said medical provider to decrypt said encrypted result which matches a result of performing a matrix multiplication on unencrypted matrices A and B thereby enabling computations to be performed on said medical data in a secure manner.

8. The computer program product as recited in claim 7, wherein the programming instructions for performing said homomorphic matrix multiplication comprise:
   performing a first linear transformation of said first ciphertext;
   performing a second linear transformation of said second ciphertext;
   deriving an updated first ciphertext using said first linear transformation of said first ciphertext and a column shifting matrix;
   deriving an updated second ciphertext using said second linear transformation of said second ciphertext and a row shifting matrix; and
   computing a Hadamard multiplication between said first and second updated ciphertexts.

9. The computer program product as recited in claim 8, wherein the programming instructions for performing said homomorphic matrix multiplication further comprise:
   aggregating all resulting ciphertexts to obtain an encrypted ciphertext of a matrix product of said matrices A and B; and
   transmitting said encrypted ciphertext of said matrix product of said matrices A and B to said medical provider.

10. The computer program product as recited in claim 7, wherein said first ciphertext encrypts said matrix A and one or more other matrices.

11. The computer program product as recited in claim 7, wherein the program code further comprises the programming instructions for:
   receiving a request for variant information;
   extracting variants from said medical data encoded as vectors; and
   converting said extracted variants to objects.

12. The computer program product as recited in claim 11, wherein the program code further comprises the programming instructions for:
   transmitting said objects to applications of said medical provider.

13. A system, comprising:
   a memory for storing a computer program for performing computations on sensitive data while guaranteeing privacy; and
   a processor connected to said memory, wherein said processor is configured to execute program instructions of the computer program comprising:
      receiving a first and a second ciphertexts from a medical provider that homomorphically encrypts matrices A and B, respectively, using an encryption key, wherein said matrices A and B comprise medical data encoded as vectors;
      performing a homomorphic matrix multiplication on said first and second ciphertexts without decrypting said first and second ciphertexts;
      generating an encrypted result from said performed homomorphic matrix multiplication on said first and second ciphertexts; and
      transmitting said encrypted result to said medical provider to decrypt said encrypted result which matches a result of performing a matrix multiplication on unencrypted matrices A and B thereby enabling computations to be performed on said medical data in a secure manner.

14. The system as recited in claim 13, wherein the program instructions for performing said homomorphic matrix multiplication comprise:
   performing a first linear transformation of said first ciphertext;
   performing a second linear transformation of said second ciphertext;
   deriving an updated first ciphertext using said first linear transformation of said first ciphertext and a column shifting matrix;
   deriving an updated second ciphertext using said second linear transformation of said second ciphertext and a row shifting matrix; and
   computing a Hadamard multiplication between said first and second updated ciphertexts.

15. The system as recited in claim 14, wherein the program instructions for performing said homomorphic matrix multiplication further comprise:
   aggregating all resulting ciphertexts to obtain an encrypted ciphertext of a matrix product of said matrices A and B; and
   transmitting said encrypted ciphertext of said matrix product of said matrices A and B to said medical provider.

16. The system as recited in claim 13, wherein said first ciphertext encrypts said matrix A and one or more other matrices.

17. The system as recited in claim 13, wherein the program instructions of the computer program further comprise:
   receiving a request for variant information;
   extracting variants from said medical data encoded as vectors; and
   converting said extracted variants to objects.

18. The system as recited in claim 17, wherein the program instructions of the computer program further comprise:
   transmitting said objects to applications of said medical provider.

* * * * *